Jan. 7, 1941. W. B. O'BRIEN, JR 2,227,601
AIR TRANSFER DEVICE
Filed July 8, 1939
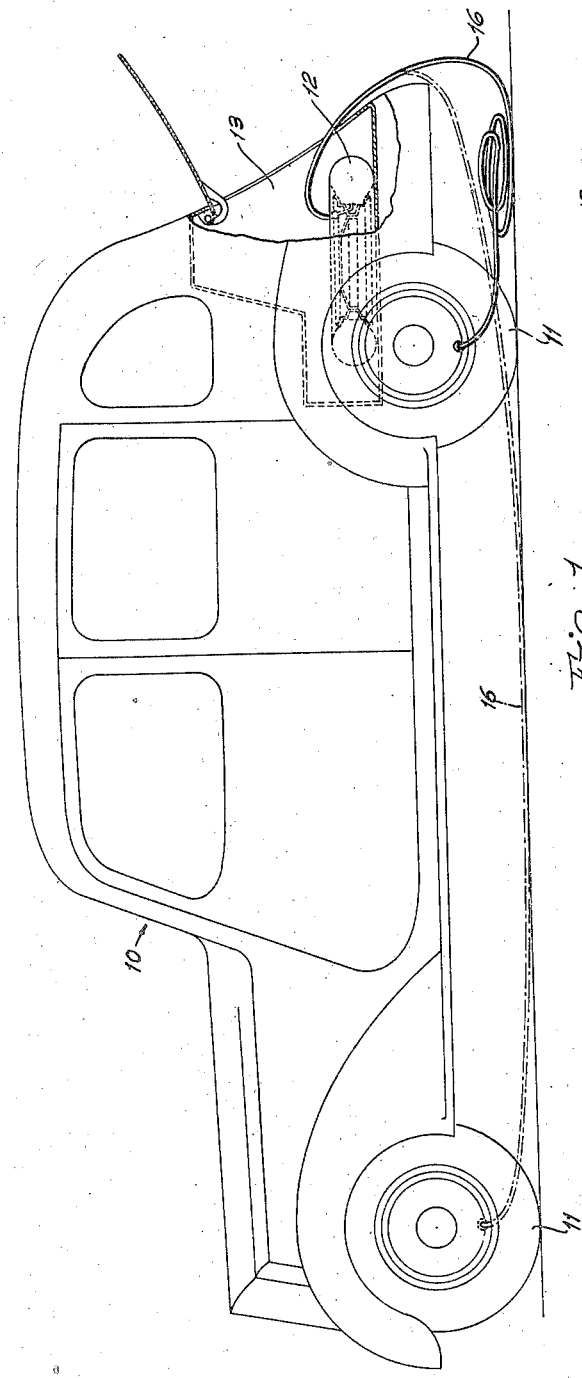
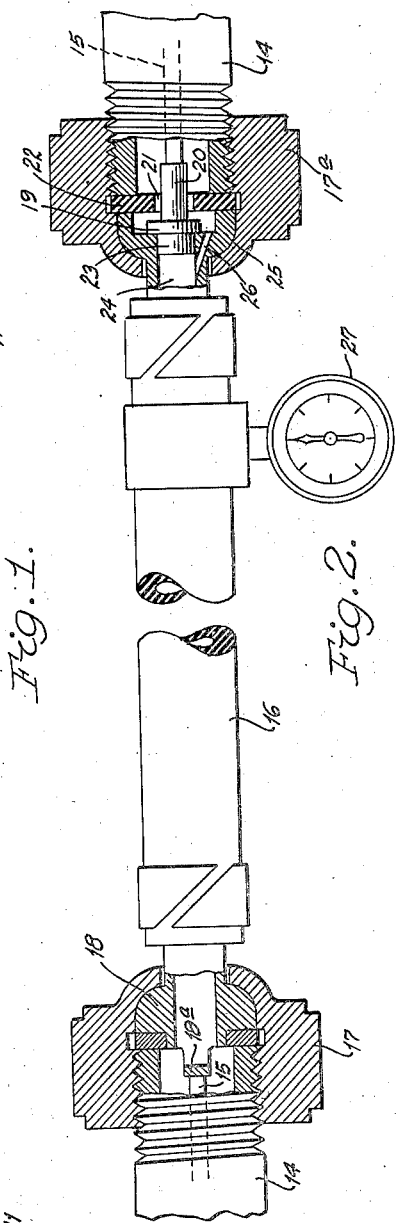
Inventor
William B. O'Brien Jr,
By
Attorney Patented Jan. 7, 1941

2,227,601

UNITED STATES PATENT OFFICE 2,227,601

AIR TRANSFER DEVICE

William B. O'Brien, Jr., Port Huron, Mich.

Application July 8, 1939, Serial No. 283,477

4 Claims. (Cl. 152—415)

This invention relates generally to devices for transferring compressed air from one motor vehicle tire to another tire. As is well known, most flat or substantially deflated tires are due to slow leaks and these often develop when standing for considerable periods of time and often occur when far from service stations requiring either inflating of the tire with a hand pump or requiring a change of tires. To change tires takes considerable time, is troublesome and the motorist changing the tire usually gets his hands and clothing soiled even where the tires or wheels are readily demountable. Several deportable devices in addition to hand pumps have been proposed for inflating tires, such as for example, air pumps operated by the vehicle engine, but these devices have been expensive, heavy and cumbersome, get out of order and generally have not been entirely satisfactory.

Accordingly, it is an object of the present invention to provide a simple, light weight, inexpensive device by means of which a deflated or partially deflated tire may be inflated at least sufficiently to permit the operator of the vehicle to drive to a service station without damage to the tire.

The present device is particularly effective with modern low pressure tires because the relatively low tire pressure makes it entirely practical and harmless to maintain twice the normal pressure in the spare tire of a motor vehicle with the result that some of the air under relatively high pressure in the spare tire can be readily transferred by the present device to a deflated tire and when a condition of balance is obtained both tires involved may have substantially normal pressure. The vehicle may then be operated for a reasonable time and permanent tire repairs may be made more conveniently later. The spare tire is then still available for service with normal pressure.

In the drawing,

Figure 1 is a side view of a motor vehicle and illustrating how my device may be employed to increase the pressure in a tire of the vehicle, and Fig. 2 is an enlarged view of my device partly broken away and in section.

Referring to the drawing by characters of reference, the numeral 10 designates generally, a motor vehicle having on its wheels the usual pneumatic tires 11 and having a spare tire 12 which, in the present instance, is carried in a rear compartment 13 of the vehicle body. The tires have the usual hollow stems 14 provided each with a check valve which are well known devices and are, therefore, not shown in detail, the valves being biased toward closed positions and each having a stem 15 which may be pushed in to unseat the valve to release air from the tire.

My device comprises in general a flexible tube, preferably a rubber hose 16 and two connections or fittings 17 and 17a secured on opposite ends thereof. In use, assuming that one of the tires on the vehicle is flat or requires an increase in pressure, the fitting 17 is connected to the hollow stem 14 of the deflated tire and the other fitting or fitting 17a is connected to the hollow stem of the spare tire 12 to transfer air from the latter to the deflated tire. Of course, to effect a transfer of air to the deflated tire, the pressure in the spare tire must be greater than atmospheric and upon such transfer the pressure in the two tires may be balanced or, if desired, only some of the air may be transferred from the spare tire to the relatively low pressure tire. The fitting 17 which is attached to the hollow stem of the deflated tire is preferably internally threaded to screwthread thereon, and within the fitting is an air seal member 18 having an extended portion 18a which on attaching the fitting to the hollow stem moves the stem inwardly to unseat the air check valve. The other fitting 17a, which is adapted for attachment to the inflated spare tire, is provided therein with a pressure actuated check valve 19 to prevent loss of air from the tire just inflated when the fitting is removed from the stem of the spare tire. The check valve 19 is provided with a reduced stem portion 20 which extends through a relatively large aperture or port 21 in a resilient seat member 22 which is secured in the fitting, the valve 19 having a second and oppositely directed stem portion 23 which is slidably received in the bore 24 of an air seal member 25. In the seal member, a bore 26 is provided for passage of air from port 21 to the bore 24, such passage of air, of course, only being possible when the valve 19 is away from its seat 22 or in the position shown in Fig. 2. In the tube 16, a pressure gage 27 is provided for indicating the pressure in the inflated tire by reason of the transfer of air thereto from a relatively high pressure tire. It will be seen that as desired, or if necessary, the herein described device may be connected to different tires on the wheels of the vehicle, for example, the stems 14 in Fig. 2 could be the stems of the two front tires or of the two rear tires or of a front and rear tire, whereby the pressure could be balanced in, or the air be equally distributed between, all of the tires on the vehicle and, ordinarily the pressure in each tire would be sufficient to permit driving of the vehicle to a service station without damage to the tires.

In using the herein described device, the fitting 17 is first attached to the tire to be inflated or to be further inflated and then the fitting 17ᵃ is attached to the spare tire or tire of relatively high pressure. Upon screwthreading the fitting 17 on the low pressure tire, the extension 19 engaging the valve stem 15 unseats the valve and if the air pressure in the deflated tire is above atmospheric, the pressure will seat valve 19, thus preventing loss of air from a partially inflated tire. When the fitting 17ᵃ is screwthreaded onto the spare tire stem or onto the stem of any of the other tires having a relatively high air pressure, the check valve extension 20 engages the valve stem 15 unseating the valve, the check valve 19 also being unseated to permit flow of air through port 21, passage 26 and into the tube 16 for passage to the other tire. After the transfer of air has been made, fitting 17ᵃ is removed first and check valve 19 is seated by the pressure in the tire just inflated. If the spare tire is carrying more than normal pressure, which it could easily do, as previously mentioned, the gage 27 will indicate when the formerly deflated tire has the proper pressure after the fitting 17ᵃ is removed.

Thus, it will be seen that I have provided a simple, inexpensive, light weight, portable device by means of which air may be readily transferred from a tire having a relatively high air pressure to one having a relatively low air pressure. This device is not only less trouble to use than a hand pump, or less trouble than to change tires, but is less expensive than such pumps, saves time, saves effort, and may be used without getting the user's hands and clothing soiled.

While I have shown and described my invention in detail it is to be understood that the same is to be limited only by the appended claims for many changes may be made without departing from the spirit and scope of the invention.

What I claim is:

1. A device for transferring air under pressure from one inflatable member having a hollow stem and a check valve therein to another inflatable member having a hollow stem and a check valve therein, comprising a flexible tube, a fitting on one end of the tube for attachment to one of the hollow stems, means within said fitting and operable to open the check valve therein upon attachment of the fitting to the stem, a second fitting on the other end of said tube for attachment to the stem of the other inflatable member, and means within said second-named fitting for opening the check valve therein upon attachment of said second-named fitting to the stem of the other inflatable member and pressure-responsive valve means between said first-named valve opening means and said second-named valve opening means for controlling flow through said tube, said second-named valve opening means and said pressure responsive means being integral.

2. A portable device for transferring air from a pneumatic tire of relatively high pressure having a check valve to a pneumatic tire of relatively low pressure having a check valve comprising, a fitting for connection to the relatively low pressure tire, means carried by said fitting for opening the valve of the low pressure tire, a fitting for connection to the high pressure tire, means connecting said first-named fitting and said second-named fitting, means carried by said second-named fitting for opening the valve of the high pressure tire, and pressure responsive valve means carried by said second-named fitting and operable to prevent escape of air of the low pressure tire from said second-named fitting.

3. A portable device for transferring air from one pneumatic tire having a hollow stem provided with an air check valve to another pneumatic tire having a hollow stem provided with an air check valve comprising, a fitting for communication with the stem of one of the tires, a fitting for communication with the stem of the other of the tires, means connecting said first-named fitting and said second-named fitting together, means carried by one of said fittings and operable to open the check valve of the tire to which said fitting is applied, means carried by the other of said fittings and operable for opening the check valve of the other of the tires, and pressure-responsive means carried by one of said fittings and operable to prevent escape of air therefrom when only the other fitting is connected to the stem of a tire.

4. A portable device for transferring air from one pneumatic tire of relatively high pressure having a stem provided with an air check valve to another pneumatic tire of relatively low pressure having a stem provided with an air valve comprising, a fitting for screwthreaded connection to the stem of one of the tires, means carried by and within said fitting for unseating the check valve in the stem of said one tire, a second fitting for communication with the stem of the other tire, a tube connecting said fittings together, means carried by and within said second-named fitting for unseating the valve in the stem of said other tire, said last-named means being pressure responsive and operable to prevent escape of air from said second-named fitting when only the first-named fitting is in communication with the stem of a tire.

WILLIAM B. O'BRIEN, Jr.